(12) United States Patent
Yin

(10) Patent No.: US 12,117,033 B2
(45) Date of Patent: Oct. 15, 2024

(54) SLIDING LIMIT TYPE NUT STRUCTURE, TELESCOPIC ROD AND ELECTRIC PUSH ROD

(71) Applicant: TOMUU ACTUATOR TECHNOLOGY CO. LTD, Dongguan (CN)

(72) Inventor: Liang Yin, Xiangtan (CN)

(73) Assignee: TOMUU ACTUATOR TECHNOLOGY CO. LTD, Dongguan (CN)

( * ) Notice: Subject to any disclaimer, the term of this patent is extended or adjusted under 35 U.S.C. 154(b) by 209 days.

(21) Appl. No.: 17/895,430

(22) Filed: Aug. 25, 2022

(65) Prior Publication Data

US 2022/0412389 A1 Dec. 29, 2022

(30) Foreign Application Priority Data

Jun. 20, 2022 (CN) .......................... 202221548458.7

(51) Int. Cl.
*F16B 37/04* (2006.01)
*F16B 7/10* (2006.01)

(52) U.S. Cl.
CPC ................ *F16B 37/04* (2013.01); *F16B 7/10* (2013.01)

(58) Field of Classification Search
CPC .. F16B 7/10; F16B 37/00; F16B 37/04; F16B 37/041; F16B 37/044–045; F16B 37/048; F16B 37/06; F16B 37/122; F16J 15/56; F16H 2025/2034

USPC .......................... 411/172, 177, 178, 427, 432
See application file for complete search history.

(56) References Cited

U.S. PATENT DOCUMENTS

| | | | | |
|---|---|---|---|---|
| 3,041,088 A * | 6/1962 | Brandon, Jr. | ....... | F16B 37/0885 411/432 |
| 6,439,817 B1 * | 8/2002 | Reed | ....... | F16B 39/06 411/110 |
| 6,461,092 B2 * | 10/2002 | Tseng | ....... | F16B 37/125 411/383 |
| 7,051,643 B1 * | 5/2006 | Bianchi | ....... | B60T 13/567 92/169.3 |
| 8,206,071 B1 * | 6/2012 | Johnson | ....... | B25B 13/065 411/383 |

(Continued)

FOREIGN PATENT DOCUMENTS

| CN | 102913529 A | 2/2013 |
|---|---|---|
| CN | 208900489 U | 5/2019 |

(Continued)

*Primary Examiner* — Roberta S Delisle
(74) *Attorney, Agent, or Firm* — Jeenam Park

(57) ABSTRACT

The present invention belongs to the technical field of electric push rods, and specifically discloses a sliding limit type nut structure, a telescopic rod and an electric push rod. The sliding limit type nut structure includes a sliding contact assembly, where an inner wall of the sliding contact assembly is provided with internal threads, both ends of the sliding contact assembly are provided with external threads and a sliding sleeve, respectively, and an outer wall of the sliding sleeve is provided with chutes. According to the present invention, the internal threads of the sliding contact assembly and the chutes on the sliding sleeve are used to convert a helical motion into stable linear sliding, which makes the motion process more stable.

9 Claims, 9 Drawing Sheets

(56) References Cited

U.S. PATENT DOCUMENTS

| | | | |
|---|---|---|---|
| 8,616,819 B1* | 12/2013 | Koster | F16B 39/04 |
| | | | 411/432 |
| 2015/0330497 A1* | 11/2015 | Amano | F16H 57/0497 |
| | | | 74/89.41 |

FOREIGN PATENT DOCUMENTS

| | | |
|---|---|---|
| CN | 211715529 U | 10/2020 |
| CN | 2146267161 U | 11/2021 |

* cited by examiner

SLIDING LIMIT TYPE NUT STRUCTURE, TELESCOPIC ROD AND ELECTRIC PUSH ROD

CROSS-REFERENCE TO RELATED APPLICATIONS

The application claims priority to Chinese patent application No. 2022215484587, filed on Jun. 20, 2022, the entire contents of which are incorporated herein by reference.

TECHNICAL FIELD

The present invention belongs to the technical field of electric push rods, and in particular relates to a sliding limit type nut structure, a telescopic rod and an electric push rod.

BACKGROUND

An electric push rod is an electric drive device, which converts a rotational motion of a motor into a linear reciprocating motion of a push rod. Electric push rods can be used as executive machines in various simple or complex technological processes to achieve remote control, centralized control or automatic control, and are mostly used in motion drive units in household appliances, kitchenware, medical apparatus, automobiles and other industries.

An existing electric push rod is directly connected to a lead screw in a threading manner by means of a nut, and the nut is used to drive an inner tube to slide axially along an outer tube. Due to long inner and outer tubes of the electric push rod and a large gap between the end of the inner tube away from the nut and the outer tube, the telescopic movement of the inner tube is unstable when the electric push rod works quickly, which directly affects the accuracy of the electric push rod.

Therefore, the inventor is committed to designing a nut, a telescopic rod and an electric push rod to solve the above-mentioned problems.

SUMMARY

An object of the present invention is provide a sliding limit type nut structure, which can convert a helical motion into stable linear sliding, so that the motion process is more stable.

Another object of the present invention is to provide a telescopic rod, with an inner tube being able to stably slide in a straight line along an outer tube, so that the telescopic motion is more stable and faster.

Another object of the present invention is to provide an electric push rod, which can be stably pushed and pulled to improve push and pull accuracy.

In order to achieve the above-mentioned object, the technical scheme adopted in the present invention is:

Disclosed is a sliding limit type nut structure, including a sliding contact assembly, where an inner wall of the sliding contact assembly is provided with internal threads, one end of the sliding contact assembly is provided with external threads, the other end of the sliding contact assembly is sleeved with a sliding sleeve, an outer wall of the sliding sleeve is provided with a plurality of chutes, and each of the chutes is arranged in an axial direction of the sliding sleeve.

As an improvement of the sliding limit type nut structure of the present invention, the sliding contact assembly includes a slider and a threaded sleeve, and the slider is sleeved outside the threaded sleeve.

As an improvement of the sliding limit type nut structure of the present invention, the threaded sleeve and the slider are screwed by means of threads, the internal threads are located on an inner wall of the threaded sleeve, and the external threads are located on an outer wall of the slider.

As an improvement of the sliding limit type nut structure of the present invention, the slider and the threaded sleeve are positioned by means of positioning screws, and the positioning screws are arranged between the slider and the threaded sleeve in the axial direction.

As an improvement of the sliding limit type nut structure of the present invention, the outer wall of the sliding sleeve is provided with a limit portion in an outwardly extending manner, and an end face of the sliding sleeve is provided with a plurality of material digging holes.

As an improvement of the sliding limit type nut structure of the present invention, an outer wall of the sliding contact assembly is provided with a plurality of side slots in its axial direction, the outer wall of the sliding contact assembly is provided with a plurality of turns of grooves in its radial direction, and the side slots are in cross communication with the grooves.

In order to achieve the above-mentioned another object, the technical scheme adopted in the present invention is:

Disclosed is a telescopic rod, including an outer tube, an inner tube and a lead screw, where the inner tube and the outer tube are sequentially sleeved outside the lead screw from inside to outside, and the outer tube, the inner tube and the lead screw are connected by means of the above-mentioned sliding limit type nut structure.

As an improvement of the telescopic rod of the present invention, the lead screw passes through the sliding contact assembly in a threading manner, the inner tube is sleeved on the external threads of the sliding contact assembly in a threading manner, the sliding sleeve is slidably arranged inside the outer tube, and the chutes are in sliding fit with sliding teeth of the outer tube.

As an improvement of the telescopic rod of the present invention, an inner wall of the outer tube is hooked with a fixing frame in its axial direction, both ends of the fixing frame are fixed with micro switches, respectively, and the sliding sleeve is located between the two micro switches.

In order to achieve the above-mentioned another object, the technical scheme adopted in the present invention is:

Disclosed is an electric push rod, including a motor and the above-mentioned telescopic rod, where the motor is in transmission connection with the telescopic rod by means of a plurality of transmission gears.

Compared with the prior art, according to the sliding limit type nut structure of the present invention, internal threads are arranged on an inner wall of a sliding contact assembly, and chutes are arranged at one end of a sliding sleeve, so that the internal threads of the sliding contact assembly and the chutes on the sliding sleeve are used to convert a helical motion into stable linear sliding, so that the motion process is more stable.

Compared with the prior art, according to the telescopic rod of the present invention, an outer tube, an inner tube and a lead screw are connected by means of a sliding limit type nut, which can convert a helical motion into stable linear sliding, so as to convert the rotation of the screw rod into stable linear sliding of the inner tube in the outer tube, which makes the telescopic motion of the inner tube more stable and faster.

Compared with the prior art, according to the electric push rod of the present invention, a motor is used to drive the telescopic rod that can perform a stable telescopic motion, so that a stable push and pull motion of the electric push rod is realized, and the push and pull accuracy can be effectively improved.

LISTING OF REFERENCE NUMERALS

1, Sliding Sleeve; 11, Chute; 12, Material Digging Hole; 13, Limit Portion; 2, Slider; 21, Side Slot; 22, Groove; 23, Limit Table; 3, Threaded Sleeve; 31, Positioning Screw; 4, Outer Tube; 41, Fixing Frame; 411, Hanging Table; 412, Positioning Slot; 42, Micro Switch; 43, Sliding Tooth; 5, Lead Screw; 51, Driven Gear; 6, Inner Tube; 7, Motor; 71, Driving Gear; and 8, Base.

DETAILED DESCRIPTION OF THE EMBODIMENTS

Embodiments of the present invention are specifically illustrated below in conjunction with the accompanying drawings. The accompanying drawings are for reference and illustration only and do not constitute a limitation on the scope of patent protection of the present invention.

Figure 1:
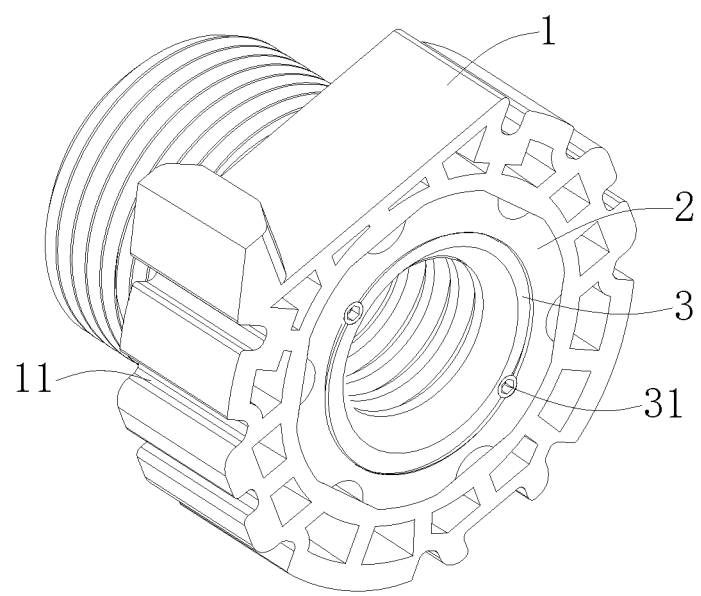
FIG. 1 is a three-dimensional enlarged view of the sliding limit type nut structure according to the present invention.
Figure 2:
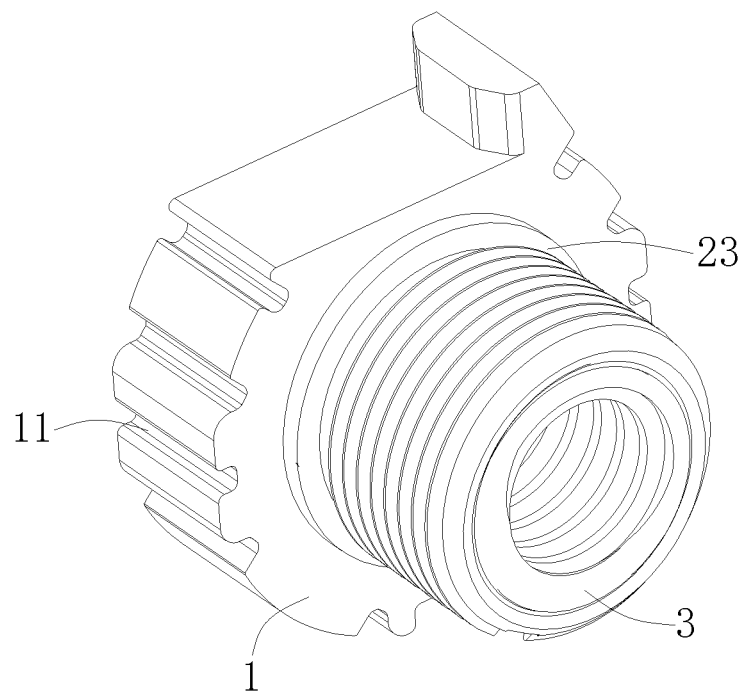
FIG. 2 is a three-dimensional enlarged view from another perspective of the sliding limit type nut structure according to the present invention.
Figure 3:
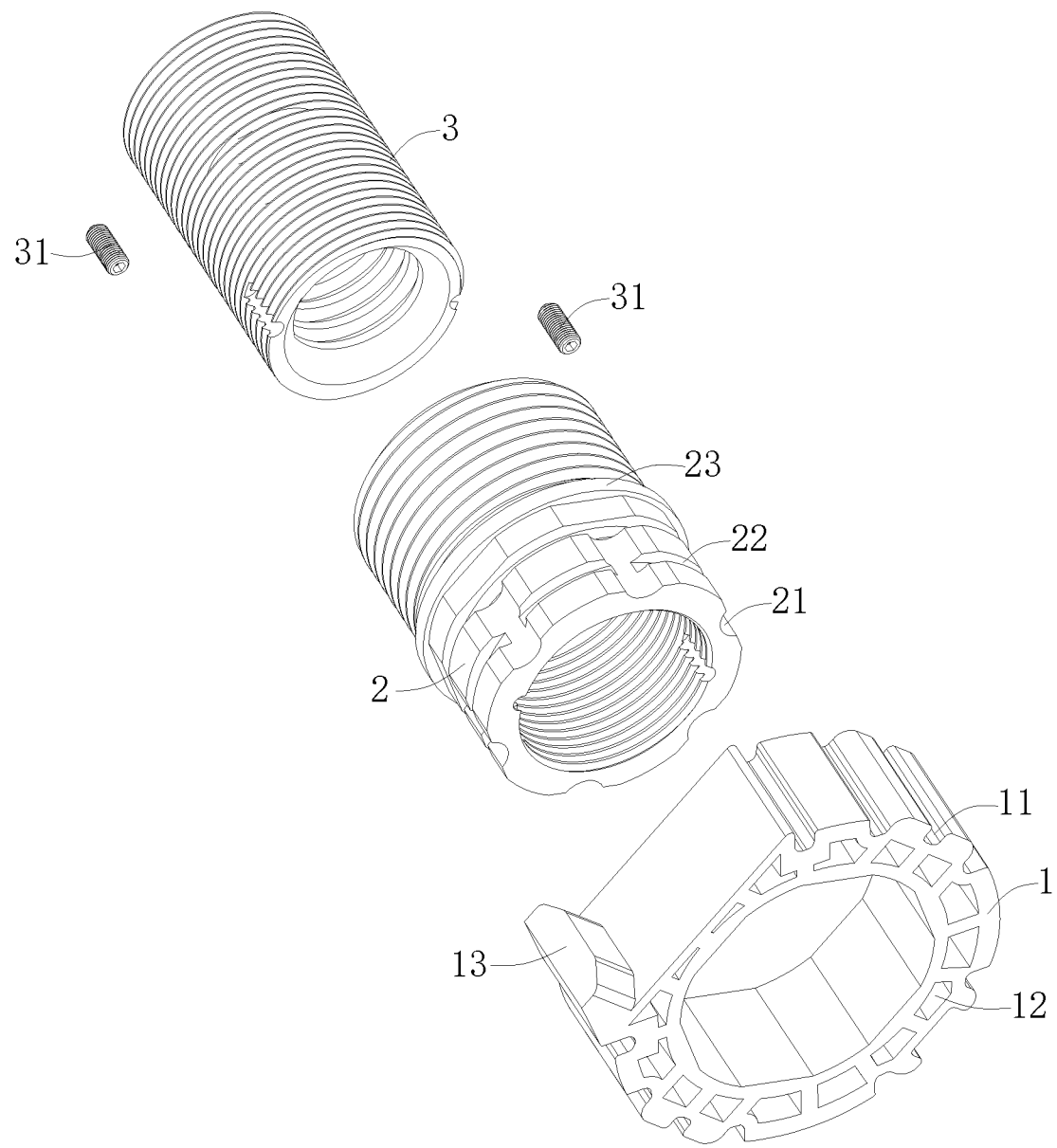
FIG. 3 is a three-dimensional exploded enlarged view of the sliding limit type nut structure according to the present invention.
Figure 4:
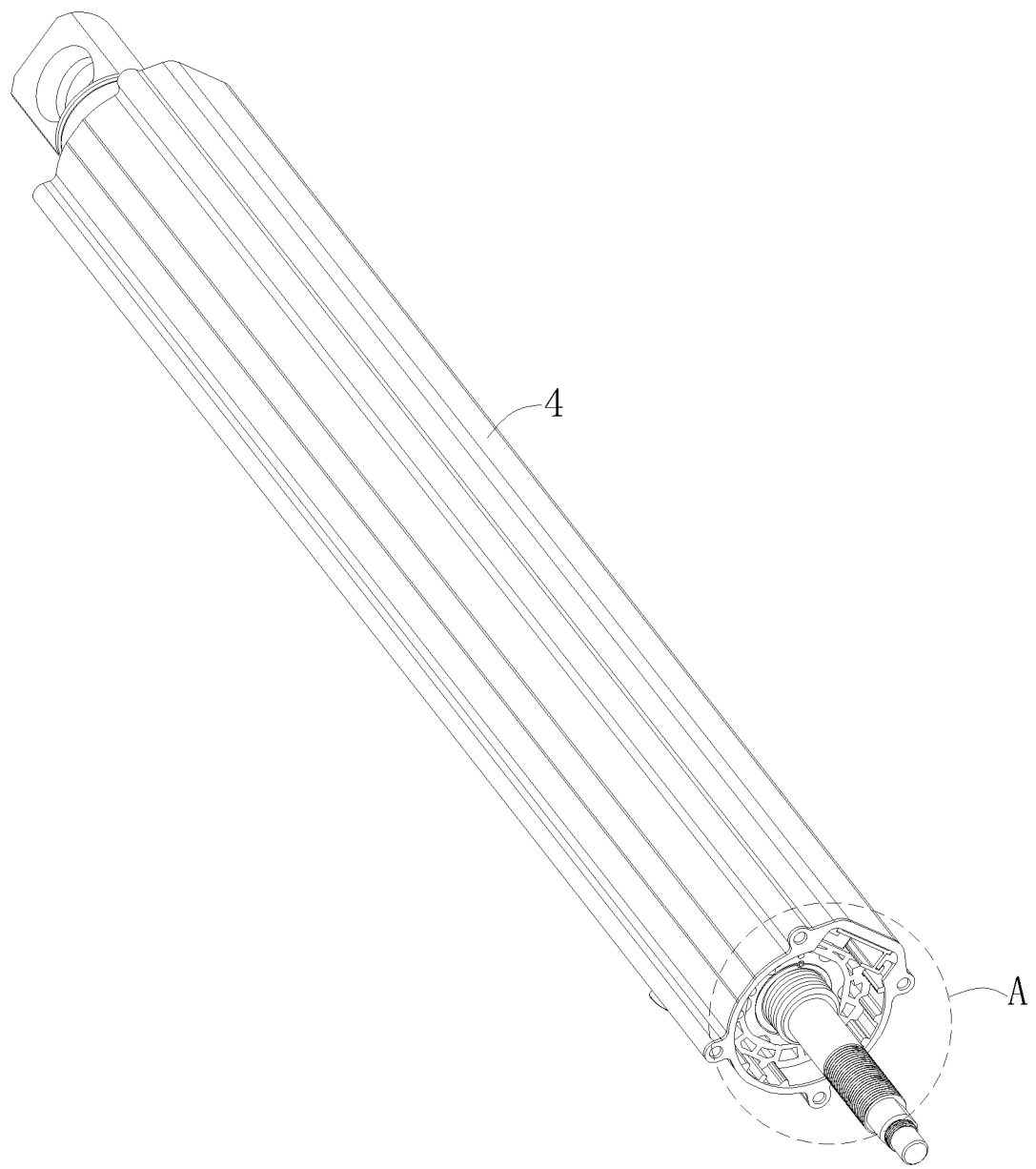
FIG. 4 is a three-dimensional enlarged view of the telescopic rod according to the present invention.
Figure 5:
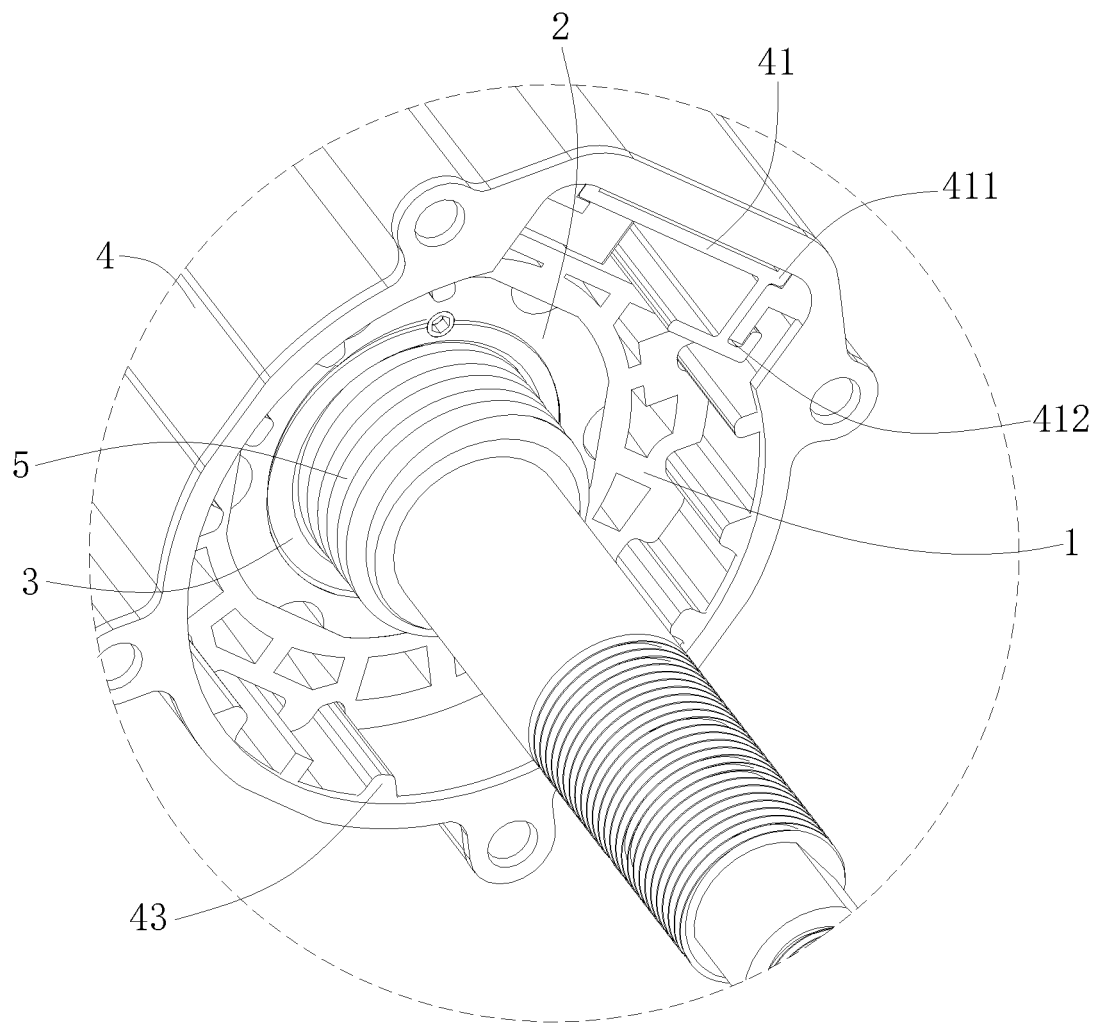
FIG. 5 is an enlarged view of A in FIG. 4.

Referring to FIG. 1 to FIG. 3, disclosed is a sliding limit type nut structure, including a sliding contact assembly and a sliding sleeve 1, where an inner wall of the sliding contact assembly is provided with internal threads, one end of the sliding contact assembly is provided with external threads, the sliding sleeve 1 is sleeved at the other end of the sliding contact assembly, an outer wall of the sliding sleeve 1 is provided with a plurality of chutes 11, and each of the chutes 11 is arranged in an axial direction of the sliding sleeve 1.

Referring to FIG. 1 to FIG. 3, the sliding contact assembly includes a slider 2 and a threaded sleeve 3, where both the slider 2 and the sliding sleeve 1 are annular, the internal threads are arranged on an inner wall of the threaded sleeve 3, and the slider 2 is sleeved outside the threaded sleeve 3. In the present embodiment, an outer wall of the threaded sleeve 3 and an inner wall of the slider 2 are connected by means of threads, so that the slider 2 and the threaded sleeve 3 act together. In order to prevent the threaded sleeve 3 from rotating relative to the slider 2, the slider 2 and the threaded sleeve 3 are positioned by means of two positioning screws 31 that are arranged between the slider 2 and the threaded sleeve 3 in the axial direction. A part of the same positioning screw 31 is located on an inner wall slot of the slider 2, and the other part of the positioning screw 31 is located on an outer wall slot of the threaded sleeve 3. The two positioning screws 31 are located on the end faces of both the slider 2 and the threaded sleeve 3 and are arranged opposite to each other, the external threads are located on the outer wall of the slider 2, and the outer wall of one end of the slider 2 away from the external threads thereof is provided with a plurality of side slots 21, a plurality of turns of grooves 22 and an annular limit table 23, where the plurality of side slots 21 are arranged in the axial direction of the slider 2, the plurality of turns of grooves 22 are arranged in the radial direction of the slider 2, the plurality of side slots 21 are in cross communication with the plurality of turns of grooves 22, and the limit table 23 is located between the plurality of turns of grooves 22 and the external threads.

Referring to FIG. 3, the inner wall of the sliding sleeve 1 and the outer wall of the slider 2 are in rotational limit fit, the outer wall of the sliding sleeve 1 is provided with a limit portion 13 in an outwardly extending manner, and an end face of the sliding sleeve 1 is provided with a plurality of material digging holes 12. When the sliding sleeve 1 is sleeved on the slider 2, the external threads on the slider 2 and the limit table 23 are located outside the sliding sleeve 1.

Referring to FIG. 1 to FIG. 3, according to the sliding limit type nut structure of the present invention, the internal threads of the sliding contact assembly and the chutes 11 on the sliding sleeve 1 are used to convert a helical motion into stable linear sliding, which makes the motion process more stable.

Referring to FIG. 4 to FIG. 8, disclosed is a telescopic rod, including an outer tube 4, an inner tube 6, a lead screw 5 and the above-mentioned sliding limit type nut structure, where the inner tube 6 and the outer tube 4 are sequentially sleeved outside the lead screw 5 from inside to outside, and the outer tube 4, the inner tube 6 and the lead screw 5 are connected by means of the above-mentioned sliding limit type nut structure.

Referring to FIG. 4, FIG. 5, FIG. 6 and FIG. 8, the outer tube 4 is in a shape of a long tube, and a plurality of sliding teeth 43 are protruded at intervals on the inner wall of the outer tube 4. When the entire nut slides in the outer tube 4, the plurality of sliding teeth 43 of the outer tube 4 cooperate with the plurality of chutes 11 on the sliding sleeve 1 in one-to-one correspondence, so that the inner tube 6 slides more smoothly relative to the outer tube 4. The inner wall of the outer tube 4 is also provided with two hanging slots and a positioning portion, and the plurality of sliding teeth 43, the two hanging slots and the positioning portion are all arranged in the axial direction of the outer tube 4. The inner wall of the outer tube 4 is hung with a fixing frame 41 in its axial direction, both ends of the fixing frame 41 are provided with elongated hanging tables 411, respectively, and the two hanging tables 411 cooperate with the two hanging slots of the outer tube 4 in one-to-one correspondence, respectively. One end of the fixing frame 41 away from the outer tube 4 is provided with a positioning slot 412, the positioning slot 412 cooperating with the positioning portion of the outer tube 4. Both ends of the fixing frame 41 are fixed with micro switches 42, respectively, and the sliding sleeve 1 is located between the two micro switches 42. The limit portion 13 of the sliding sleeve 1 is located on the side of the fixing frame 41, and the entire nut can slide between the two micro switches 42. When the limit portion 13 of the sliding sleeve 1 touches one of the micro switches 42, the entire nut slides towards the other micro switch 42.

Figure 6:
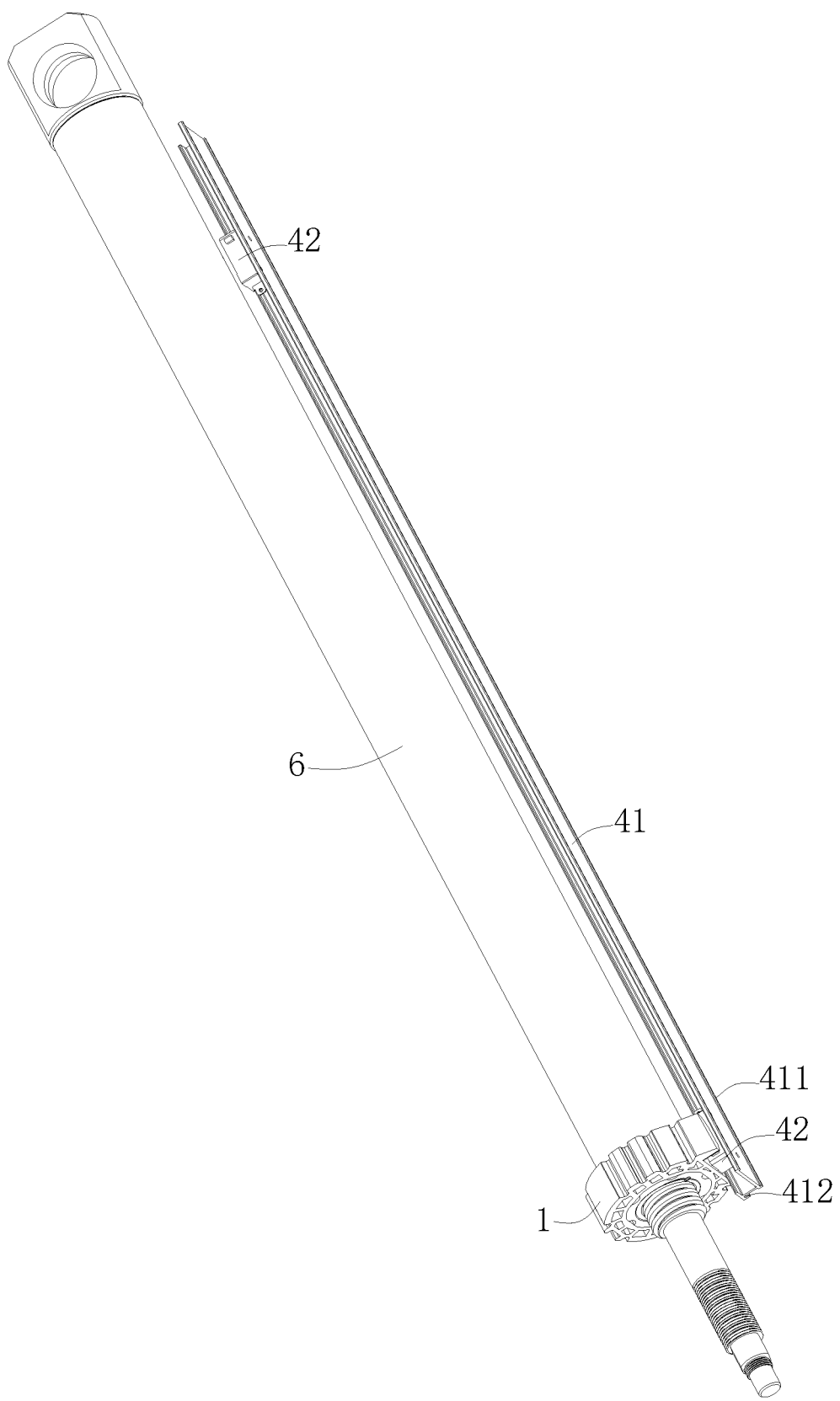
FIG. 6 is a three-dimensional enlarged view of the telescopic rod removing the outer tube according to the present invention.
Figure 7:
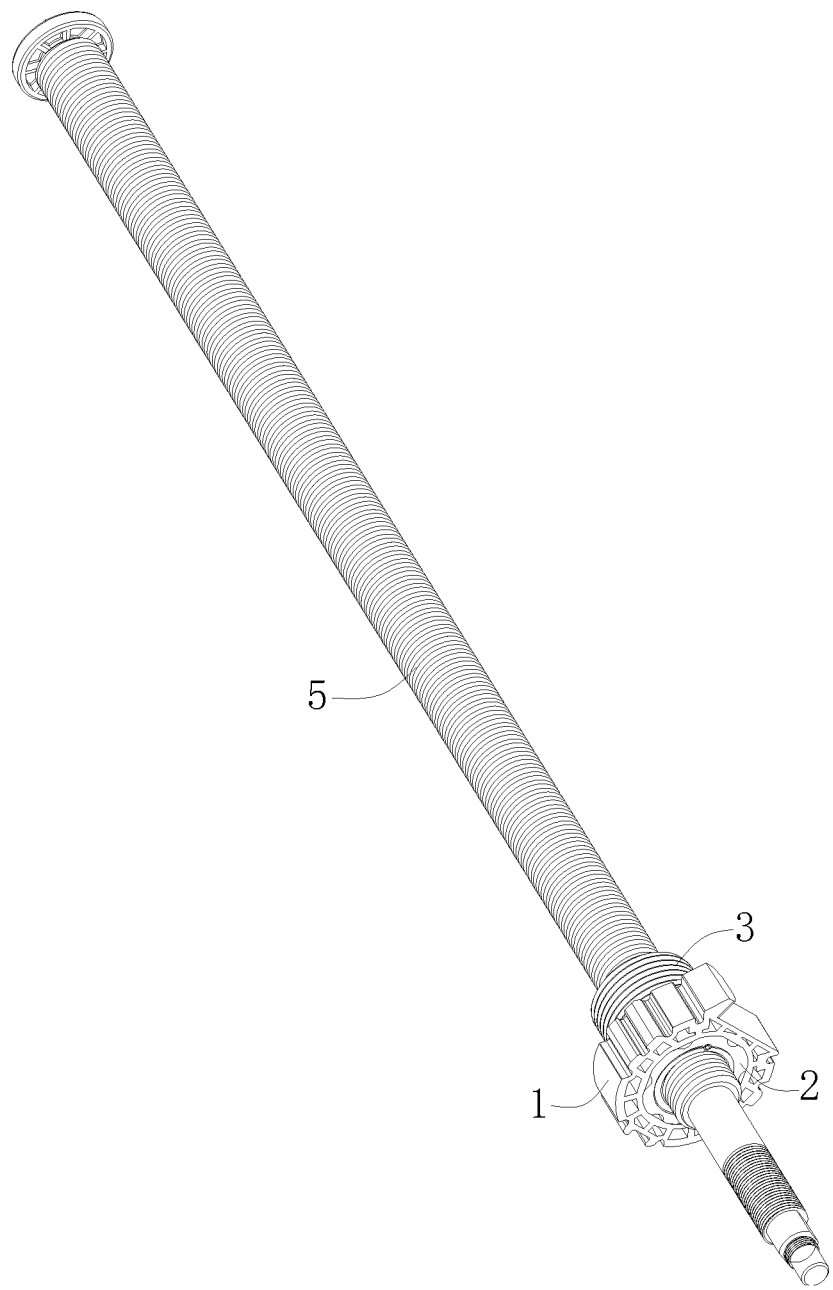
FIG. 7 is a three-dimensional assembled enlarged view of the lead screw and the nut according to the present invention.
Figure 8:
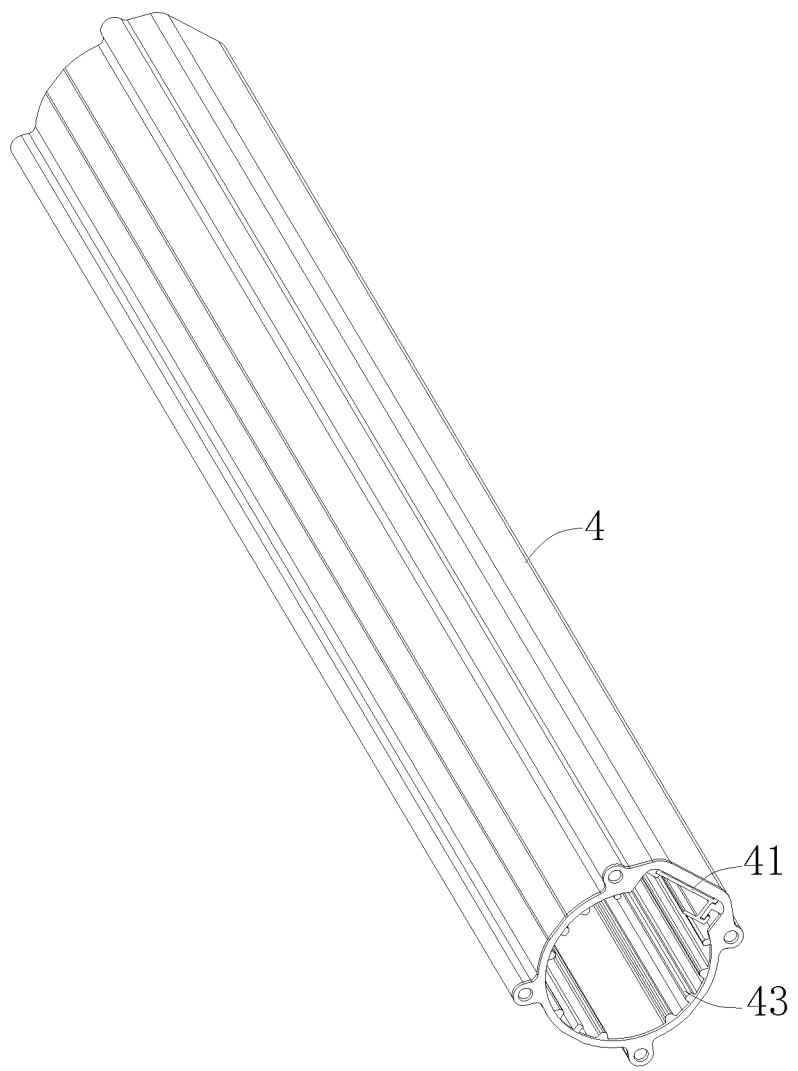
FIG. 8 is a three-dimensional assembled enlarged view of the outer tube and the fixing frame according to the present invention.

Referring to FIG. 6 and FIG. 7, the lead screw 5 passes through the threaded sleeve 3 in a threading manner, that is, the outer wall of the lead screw 5 is connected to the threaded sleeve 3 in a threading manner, and one end of the inner tube 6 close to the nut is sleeved on the external threads of the slider 2 and presses against the limit table 23, so that the inner tube 6 and the slider 2 are fixedly connected by means of threads.

Referring to FIG. 1 to FIG. 8, the working principle of the telescopic rod of the present invention is: the lead screw 5 is rotated by an external force to drive the threaded sleeve 3, the slider 2 and the sliding sleeve 1 to slide axially along the sliding teeth 43 of the outer tube 4, so that the inner tube 6 axially moves inside the outer tube 4 to realize the telescopic action of the inner tube 6, and when the limit portion 13 of the sliding sleeve 1 touches one of the micro switches 42, the entire nut slides towards the other micro switch 42.

Figure 9:
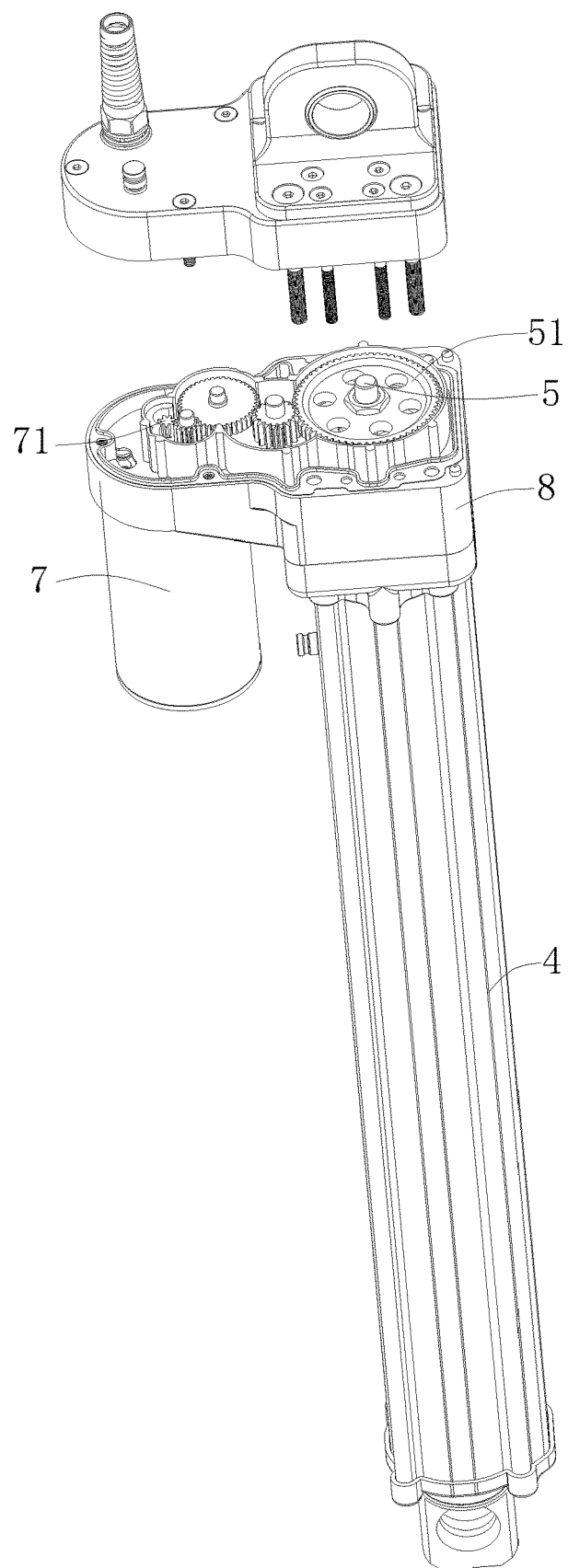
FIG. 9 is a three-dimensional exploded view of the electric push rod according to the present invention.

Referring to FIG. 9, disclosed is an electric push rod, including a motor 7 and the above-mentioned telescopic rod, where an output end of the motor 7 is provided with a driving gear 71, the lead screw 5 of the telescopic rod is provided with a driven gear 51, the driving gear 71 is meshed with the driven gear 51 by means of a plurality of transmission gears, and the driving gear 71, the transmission gears and the driven gear 51 are all located inside a base 8.

Referring to FIG. 9, the working principle of the electric push rod of the present invention is: the motor 7 drives the driving gear 71 to rotate, the driving gear 71 drives the driven gear 51 to rotate by means of a plurality of transmission gears, so as to drive the lead screw 5 to rotate, and the lead screw 5 drives the entire nut to slide reciprocally in the outer tube 4, thereby realizing the telescopic action of the inner tube 6.

What are disclosed above are only preferred embodiments of the present invention, and cannot be used to limit the scope of rights protection of the present invention. Therefore, equivalent changes made in the scope of the patent application of the present invention still belong to the scope covered by the present invention.

What is claimed is:

1. A sliding limit type nut structure, comprising a sliding contact assembly, wherein an inner wall of the sliding contact assembly is provided with internal threads, one end of the sliding contact assembly is provided with external threads, the other end of the sliding contact assembly is sleeved with a sliding sleeve, an outer wall of the sliding sleeve is provided with a plurality of chutes, and each of the chutes is arranged in an axial direction of the sliding sleeve; an outer wall of the sliding contact assembly is provided with a plurality of side slots in its axial direction, the outer wall of the sliding contact assembly is provided with a plurality of turns of grooves in its radial direction, and the side slots are in cross communication with the grooves.

2. The sliding limit type nut structure of claim 1, wherein the sliding contact assembly comprises a slider and a threaded sleeve, and the slider is sleeved outside the threaded sleeve.

3. The sliding limit type nut structure of claim 2, wherein the threaded sleeve and the slider are screwed by means of threads, the internal threads are located on an inner wall of the threaded sleeve, and the external threads are located on an outer wall of the slider.

4. The sliding limit type nut structure of claim 2, wherein the slider and the threaded sleeve are positioned by means of positioning screws, and the positioning screws are arranged between the slider and the threaded sleeve in the axial direction.

5. The sliding limit type nut structure of to claim 1, wherein the outer wall of the sliding sleeve is provided with a limit portion in an outwardly extending manner, and an end face of the sliding sleeve is provided with a plurality of material digging holes.

6. A telescopic rod, comprising an outer tube, an inner tube and a lead screw, with the inner tube and the outer tube being sequentially sleeved outside the lead screw from inside to outside, wherein the outer tube, the inner tube and the lead screw are connected by means of the sliding limit type nut structure of claim 1.

7. The telescopic rod of claim 6, wherein the lead screw passes through the sliding contact assembly in a threading manner, the inner tube is sleeved on the external threads of the sliding contact assembly in a threading manner, the sliding sleeve is slidably arranged inside the outer tube, and the chutes are in sliding fit with sliding teeth of the outer tube.

8. The telescopic rod of claim 6, wherein an inner wall of the outer tube is hooked with a fixing frame in its axial direction, both ends of the fixing frame are fixed with micro switches, respectively, and the sliding sleeve is located between the two micro switches.

9. An electric push rod, comprising a motor and the telescopic rod of claim 6, wherein the motor is in transmission connection with the telescopic rod by means of a plurality of transmission gears.

* * * * *